United States Patent

Foley et al.

Patent Number: 5,915,272
Date of Patent: Jun. 22, 1999

[54] METHOD OF DETECTING LOW COMPRESSION PRESSURE RESPONSIVE TO CRANKSHAFT ACCELERATION MEASUREMENT AND APPARATUS THEREFOR

[75] Inventors: John F. Foley, Novi; Steven L. Plee, Brighton; Donald J. Remboski, Jr., Dearborn, all of Mich.

[73] Assignee: Motorola Inc., Schaumburg, Ill.

[21] Appl. No.: 08/100,418

[22] Filed: Aug. 2, 1993

[51] Int. Cl.⁶ .................................................. G01M 15/00
[52] U.S. Cl. .............................. 73/115; 73/117.3; 701/110
[58] Field of Search .................................. 73/115, 117.3, 73/117.2, 119 A, 116, 118.1; 324/162, 178, 179; 364/551.01; 701/110, 111

[56] References Cited

U.S. PATENT DOCUMENTS

| | | | |
|---|---|---|---|
| 3,775,684 | 11/1973 | Hoodwin | 324/162 |
| 4,016,753 | 4/1977 | Willenbacher et al. | 73/116 |
| 4,292,670 | 9/1981 | Reid et al. | 364/437 |
| 4,295,363 | 10/1981 | Buck et al. | 73/117.3 |
| 4,517,648 | 5/1985 | Ina et al. | 364/551.01 |
| 4,562,728 | 1/1986 | Timmerman | 364/551.01 |
| 4,936,277 | 6/1990 | Deutsch et al. | 123/436 |
| 5,307,671 | 5/1994 | Akase | 73/117.3 |
| 5,321,979 | 6/1994 | McKendry et al. | 73/115 |
| 5,351,528 | 10/1994 | Fukui et al. | 73/115 |
| 5,386,723 | 2/1995 | Wier | 73/117.3 |
| 5,402,675 | 4/1995 | Entenmann et al. | 73/117.3 |

OTHER PUBLICATIONS

Toyoda's Next–Generation Lean Burner; Jul. 1992 Automotive Industries p. 21.

Toyota Lean Combustion System–The Third Generation; Tokuta Inoue, Toyota Motor Corp. SAE Technical Paper Series #930873 International Congress and Exposition Detroit MI Mar. 1–5, 1993 SAE International.

Combustion Pressure Sensor for Toyota Lean Burn Engine Control; SAE Technical Paper Series #930882 International Congress and Exposition Detroit, MI Mar. 1–5, '993 SAE International, Nobuyoshi Sugitani.

*Primary Examiner*—Richard Chilcot
*Assistant Examiner*—Eric S. McCall
*Attorney, Agent, or Firm*—Nicholas C. Hopman

[57] ABSTRACT

A method of detecting low compression pressure by interpreting acceleration of an engine crankshaft (201) is detailed. In a preferred embodiment, the method teaches measurement of intake manifold pressure. Then, a first engine crankshaft acceleration is measured, preferably proximate a maximum rate of compression, for a cylinder (113), and a first variable (307) indicative of the first engine crankshaft acceleration is provided. Then, a second engine crankshaft acceleration is measured, preferably proximate the cylinder's top-dead-center position (105), and a second variable (311) indicative of the second engine crankshaft acceleration is provided. Then, the method combines (313) the intake manifold pressure, the first variable, and the second variable and provides a compression pressure variable as a function of the combined variables. Other embodiments include subsets of the above variables to provide a compression pressure variable as a function of the combined variables. In all of the embodiments, a low compression pressure may be indicated (317) when the compression pressure variable does not exceed a predetermined limit for the associated cylinder. An apparatus is also detailed in support of the preferred method.

48 Claims, 2 Drawing Sheets

METHOD OF DETECTING LOW COMPRESSION PRESSURE RESPONSIVE TO CRANKSHAFT ACCELERATION MEASUREMENT AND APPARATUS THEREFOR

FIELD OF THE INVENTION

This invention is related to the field of compression pressure detection within an internal combustion engine, and more specifically to a method, and corresponding apparatus, for determining a low compression pressure condition during a combustion event in an engine by interpreting acceleration of the engine's crankshaft.

BACKGROUND OF THE INVENTION

Maintaining a sufficient compression pressure in a cylinder's combustion chamber internal combustion engine is vital for insuring proper combustion of air and fuel ingested into the cylinder. Typical causes of a low compression pressure condition in a cylinder may include damaged piston rings, valves, or head gasket to identify a few. Low compression pressure causes loss of power, misfires, incomplete combustion—resulting in increased hydrocarbon emissions, loss of fuel economy, and hard starts in diesel engines.

As the demand for increased engine performance increases, low cylinder compression pressure must be diagnosed in real time on an engine in service, so that the condition can be corrected as soon as possible.

For most contemporary engines compression pressure is checked by a service tester in a service environment. This tester is not indigenous to the engine. The engine is typically taken out of normal operating service so a compression pressure test may be run. These testers ordinarily rely on the connection of an in-cylinder pressure tester to a particular cylinder of the engine. The problems with this scheme include that the engine must be removed from normal operating service, compression pressure of only one cylinder can be measured at a time, the compression pressure is measured in a controlled environment and not as the engine is operating under actual conditions.

Another scheme, that measures in-cylinder combustion while the engine is operating in normal service, relies on individual sensors in each cylinder. These sensors are cost prohibitive, need to be individually calibrated, and also have limited durability. Also, individual mounting of sensors on each of the engine's cylinders is not desirable from a manufacturing viewpoint. Further, these sensors require space on the engine's cylinder heads that is scarce particularly in 4 valve engines, and interfere with the combustion process. Additionally, each sensor must be individually calibrated to eliminate internal errors.

Other prior art systems measure average engine crankshaft velocity to predict compression. Still other prior art schemes measure a time between two distal positions of the engine crankshaft to predict compression. These schemes are susceptible to inaccuracies associated with transient engine operation. Since an engine crankshaft can accelerate/decelerate at several thousand revolutions /sec$^2$ any transient accelerations or decelerations occurring during the measurement of these velocities or times will cause the compression prediction to be inaccurate. For instance a deceleration may be observed as a loss of compression. Significantly, inaccuracy associated with transient engine operation can easily exceed the span of the measurement. For example, this may result in an indication of near zero compression when the cylinder is operating properly.

Also, prior art schemes have not accounted for the large difference in intake manifold pressure over the engine operating range. The intake manifold pressure, is ordinarily in the range of 30 kPa to 100 kPa absolute over the engine s normal operating range. This range is dependent on engine speed and load, and may vary another ±10% due to altitude changes. Because prior art schemes do not account for this variation in intake manifold pressure they can be in excess of 30% inaccurate.

Also, these prior art schemes fail to eliminate error due to non-combustion related torque influencing the compression measurement. These non-combustion related effects, which are typically attributable to variations in engine load torque, friction torque, and inertia torque, can add even more significant error to the prior art measurement schemes. Significantly, inaccuracy associated with non-combustion related effects can easily exceed the span of the measurement.

Since it is required to measure compression within a few percent in modern engines, these prior art schemes are grossly inadequate.

What is needed is an improved system for detecting low compression pressure in internal combustion engines that is more durable, cost effective, manufacturable, requires less calibration, and does not interfere with the combustion process.

DETAILED DESCRIPTION OF A PREFERRED EMBODIMENT

Figure 1:
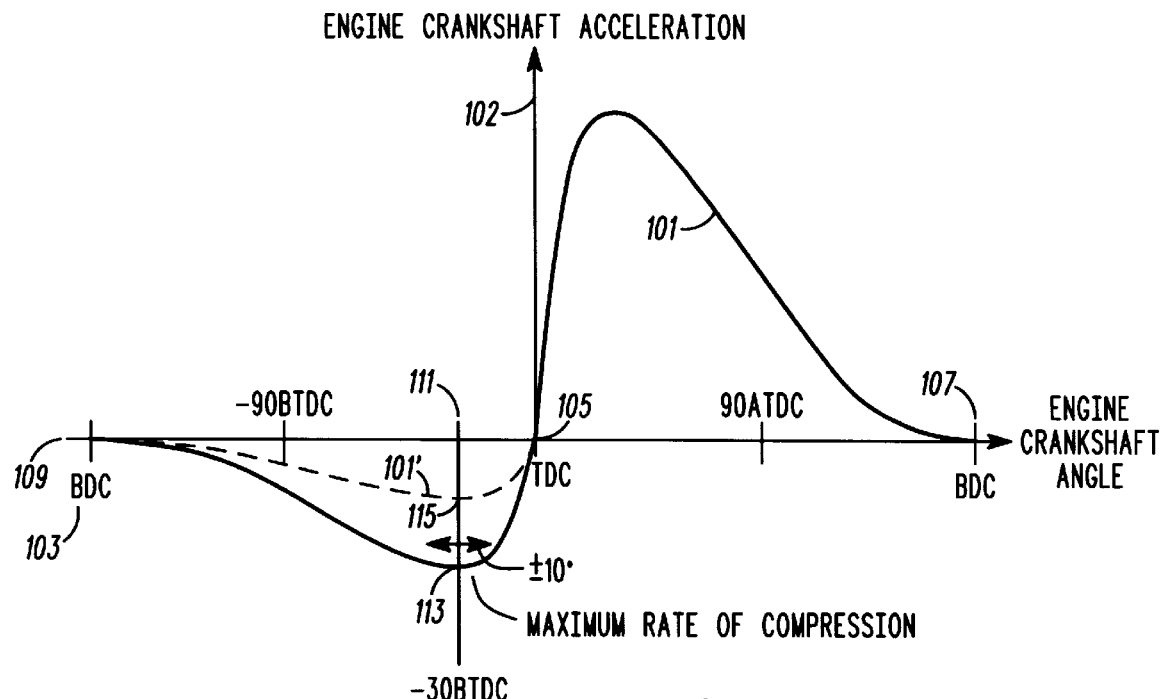
FIG. 1 is a chart of a signal derived from a sensor measuring angular acceleration of an engine crankshaft.

In a preferred embodiment, a method of compression pressure determination for a reciprocating engine is detailed. The improvements described in the preferred embodiment can be applied to any reciprocating class engine including for instance, a diesel engine, a stratified charge engine, or a spark ignition engine. In the preferred embodiment the application to a spark ignition engine is described.

The preferred method of compression pressure determination includes a first measurement of an acceleration of the engine's crankshaft proximate a maximum rate of compression, or minimum acceleration, of a cylinder, and preferably, later in time, a second measurement of an acceleration of the engine's crankshaft proximate the same cylinder's top-dead-center position in the same combustion cycle. Then the second acceleration quantity is subtracted from the first acceleration quantity and the result is divided by a variable indicative of intake manifold pressure yielding a compression pressure variable indicative of a compression pressure in the combustion chamber of the now expanding cylinder. Preferably a low compression indication is provided when the compression pressure variable does not exceed a predetermined combustion pressure threshold. This combustion pressure threshold may be determined empirically for each engine family.

Of course, other relationships or functions of the aforementioned variables will also predict the compression pressure in the cylinder. In a simpler embodiment, the first acceleration quantity is divided by the variable indicative of intake manifold pressure. This results in a variable indicative of a compression pressure. Now, this variable can be compared to the threshold to indicate a low compression pressure. This embodiment alone would improve the compression measurement by swamping out intake pressure related effects on the compression pressure determination. This can, in some applications improve the measurement accuracy by at least the span of the measurement and perhaps more.

In an even simpler embodiment, a singular measurement of engine crankshaft acceleration may be measured centered on the maximum rate of compression of the compressing cylinder. This will also yield a compression pressure variable indicative of a compression pressure in the combustion chamber of the cylinder. This embodiment alone would improve the compression measurement by swamping out transient engine operating effects. This can, in some cases, improve the measurement accuracy by about the span of the measurement.

The preferred embodiment measures two accelerations and an intake manifold pressure to cancel the effects of, non-compression related torque effects on crankshaft acceleration, transient engine operating effects, and intake manifold pressure variations, which can alone improve the measurement accuracy by about 30%.

Application of each of these embodiments results a in significant improvement in determination of compression pressure in an active cylinder. Further, this can be extended to all cylinders on an engine without much additional effort.

The chart in FIG. 1 shows a waveform 101 derived from a sensor that is measuring an angular acceleration of an engine crankshaft during a singular combustion cycle for one cylinder. A horizontal axis 109 represents degrees of engine crankshaft angular rotation. A vertical axis 102 represents engine crankshaft acceleration. A portion of the waveform 101, located between BDC (Bottom Dead Center) 103 and TDC (Top-dead-center) 105, represents a compression portion of the combustion cycle for the cylinder. Another portion of the waveform 101, located between TDC 105, and a next BDC 107, represents an expansion portion of the same combustion cycle. Each cylinder in a multi-cylinder engine behaves in this manner.

Starting at cylinder BDC 103 the acceleration signal is substantially equal to zero. At this engine angular position, the cylinder's piston is compressing both air and fuel in a compression portion of the combustion cycle. As the engine continues to rotate the acceleration waveform 101, decelerates, or has a negative acceleration. This rate of negative acceleration depends on the amount of air and fuel charged into the cylinder, heat transfer characteristics, and the amount of leakage in the cylinder caused by the piston rings, valves, and head gasket. Proximate 30° BTDC 111, this negative acceleration trend peaks and reverses to a positive acceleration trend. This positive acceleration trend continues past cylinder TDC 105, where it is again substantially zero, to a following angular position of the next BDC 107 where the acceleration trend reverses and repeats.

Note that in the expansion portion of the compression cycle, located between TDC 105 and the next BDC 107, the absolute amplitude of the engine crankshaft acceleration is higher than it was at 30° BTDC 111. This is because proper combustion occurred which resulted in this difference. Preceding this, proximate 30° BTDC 111, at reference number 113 the acceleration waveform 101 achieves an amplitude representing proper, or normal, compression pressure.

Another waveform shown proximate 30° BTDC 111, at reference number 115, illustrates a result of improper compression pressure in an engine crankshaft acceleration waveform 101'. This improper compression pressure may be caused by damaged piston rings, leaky valves, or a leaky head gasket. As mentioned above, the peak of negative acceleration, or maximum rate of compression, occurs proximate 30° BTDC. Typically, individual cylinder combustion occurs somewhere between 20° before cylinder TDC and 40° after cylinder TDC, depending on operating conditions and engine geometry. Because of this, the acceleration proximate 30° BTDC ±10° is of relevance when evaluating the effectiveness of a cylinder to foster a normal compression pressure.

So, by observing the acceleration of the engine crankshaft during individual cylinder's compression cycle, a low compression condition can be detected. The following equation illustrates a relationship between in-cylinder pressure and engine crankshaft acceleration.

$$\frac{P_{30°BTDC}}{P_{IDEAL}} \sim \frac{(\alpha_{TDC} - \alpha_{30°BTDC})}{P_{INTAKE}}$$

where:

$P_{30°BTDC}$=in-cylinder compression pressure predicted with the engine crankshaft proximate a maximum rate of compression, or minimum acceleration $P_{IDEAL}$=ideal in-cylinder pressure with no leakage, as predicted by thermodynamics, and dependent on $P_{INTAKE}$ $\alpha_{TDC}$=acceleration of the engine crankshaft measured proximate cylinder TDC $\alpha_{30°BTDC}$=acceleration of the engine crankshaft measured proximate 30° BTDC $P_{INTAKE}$=measured intake manifold pressure variable The above equation expresses a proportional relationship between in-cylinder pressure and engine crankshaft acceleration. However, absolute in-cylinder pressure may also be derived from the above equation if desirable. This is not necessary here.

By simply measuring the above-mentioned engine crankshaft accelerations and intake manifold pressure variable, and computing the resulting proportional pressure, or compression pressure variable, and comparing the result to an empirically determined threshold, low in-cylinder compression pressure can be detected. Note that the inclusion of the $P_{INTAKE}$ variable is to normalize the mass of gas trapped in the cylinder. If not included, low throttle may appear as a low compression condition.

Alternative methods may also be employed, however the result would be a less accurate measurement because non-compression pressure related effects may influence the low compression pressure determination. For instance, the impact of $P_{INTAKE}$ is essentially a static effect at any given engine speed and throttle setting. Therefore, one may simply measure it at a fixed RPM and load—say engine idle and substitute a constant in the above equation. $P_{INTAKE}$, the intake manifold pressure, is ordinarily in the range of 30 kPa to 100 kPa absolute over the engine's normal operating range. It is relatively steady at a fixed RPM and load, with altitude influences accounting for only about a ±10% error.

Alternatively, one may simply measure an acceleration during the cylinder's compression cycle and compare it to a low compression threshold. If this approach is adopted, preferably, the singular measurement would occur in the compression portion of the combustion cycle to eliminate potentially determining low compression pressure in an expansion stroke related to poor combustion performance.

Of course, non combustion related torques may influence the accuracy of this approach.

In summary, the embodiment of choice includes the method of subtracting the first acceleration variable from the second acceleration variable and dividing the difference by the intake manifold pressure variable. This will yield the most accurate, robust, least non-compression related effect, measurement related to in-cylinder combustion pressure. Those skilled in the art will recognize other, equivalent relationships between the first acceleration variable, the second acceleration variable, and the intake manifold pressure variable that may be related to in-cylinder combustion pressure.

Beneficially, by measuring engine crankshaft acceleration, rather than velocity as measured by other schemes, transient engine operation does not affect the observation. This is because by simply measuring engine crankshaft velocity, the prior art schemes were susceptible to errors associated with engine accelerations between comparative velocity measurements. Also, by subtracting the engine crankshaft acceleration at TDC from the engine crankshaft acceleration at maximum compression any non-combustion related torques are eliminated from the computed in-cylinder compression pressure variable. Next, an apparatus to support execution of the improved method will be described.

Figure 2:
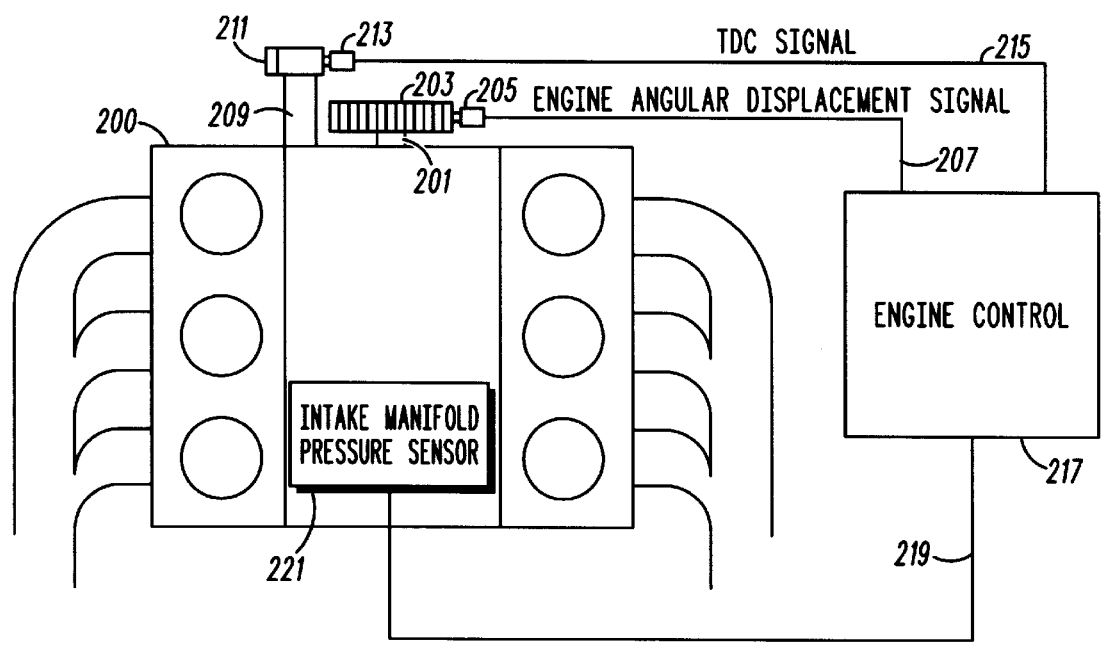
FIG. 2 is a system block diagram in accordance with the invention.

FIG. 2 is a system block diagram illustrating apparatus necessary to support the improved method. A flywheel 203, is connected to an engine crankshaft 201 and has lobes, or teeth disposed on its exterior edge. The crankshaft is coupled to a multi-cylinder engine 200. In the preferred embodiment the teeth on the flywheel 203 are spaced at 10° intervals for the convenience of the improved method that is described. Of course, those skilled in the art will acknowledge that other tooth spacing will yield the same beneficial results. The teeth on the flywheel 203 are sensed by an inductive transducer 205 as the flywheel 203 is driven by the engine crankshaft 201. The inductive transducer 205 provides an engine angular displacement signal 207 indicative of the angular displacement of the flywheel 203.

A camshaft 209, also coupled to the engine 200, has a singular tooth mounted on a camshaft wheel 211. Another inductive transducer 213, provides a TDC signal 215 indicative of TDC position of the camshaft wheel 211.

Signals 207 and 215 are provided to a control device, in this case an engine control 217. Of course, other sensing technologies such as Hall-Effect, optical or RF (radio frequency) may be used in place of the flywheel 203, the camshaft wheel 211, and the corresponding sensors 205 and 213. Also, those skilled in the art may contemplate other methods of measuring the acceleration, thus the torque output, from the combustion process that will also benefit from this method. This may include, for instance, an in-line torque sensor. The method described herein only relies on the torque output of the engine measured as engine crankshaft angular displacement—later converted to acceleration information, and the corresponding absolute position information, or camshaft TDC information no matter how it is sensed.

The engine control 217 accepts these input signals 207 and 215 for determining both the acceleration of the engine crankshaft 201, using the engine angular displacement signal 207, and absolute engine position, using both signal 207 and the TDC signal 215. The absolute position of the engine is important to know so that the engine control can determine which cylinder it is presently testing for low compression.

The engine control 217 is constructed using a Motorola MC68HC711 E9 microcontroller. Conveniently, the MC68HC711 E9 microcontroller has integral counter-timers that are useful in processing the signals 207 and 215 for determining the acceleration and individual absolute cylinder positions. The MC68HC711 E9 microcontroller, embedded in the engine control 217, executes the improved method that is embedded into its EPROM (Erasable Programmable Read Only Memory) program memory. The improved method is represented later in flow chart form in FIG. 3. Those skilled in the art will recognize many other substantially equivalent apparatus for executing the method.

A software routine, not detailed here, given the signals 207 and 215, determines the absolute engine crankshaft position in terms of angular displacement. As mentioned earlier the teeth on the flywheel 203 are spaced at 10° intervals. This routine, synchronized by the camshaft TDC signal 215, and simply counts teeth to determine the absolute engine crankshaft position in terms of angular displacement. In the preferred embodiment a four stroke six cylinder engine is used. The firing order is 1, 4, 2, 5, 3, 6. Cylinder TDC is then 720°/6 or expected every 120°. Therefore, cylinder 1 TDC is located at 0° flywheel position, cylinder 4 TDC is located at 120° flywheel position, cylinder 2 TDC is located at 240° flywheel position, cylinder 5 TDC is located at 360° flywheel position, cylinder 3 TDC is located at 480° flywheel position, and cylinder 6 TDC is located at 600° flywheel position. Of course, other engines with different firing orders and cylinder TDC's can be easily measured with other flywheel teeth arrangements and slight modifications to the routine. Those skilled in the art will recognize many other, equivalent means and methods to determine absolute engine crankshaft position.

The angular displacement signal 207 is converted to acceleration. Those skilled in the art will also recognize many techniques of extracting this information from the engine angular displacement signal 207. Alternatively, an accelerometer may be used to measure the acceleration of the engine's crankshaft. In the preferred embodiment a counter, embedded in the MC68HC711 E9 microcontroller, counts the time between teeth positioned on the flywheel 203. The result is used to calculate the engine crankshaft acceleration by comparing successive values of measured times. Preferably, a filter is then applied to remove a portion of the non-combustion torque related information. This may take the form of torsional vibrations, or very low frequency acceleration effects. Now that both engine crankshaft acceleration and cylinder identification has been described, the improved method will be detailed.

Figure 3:
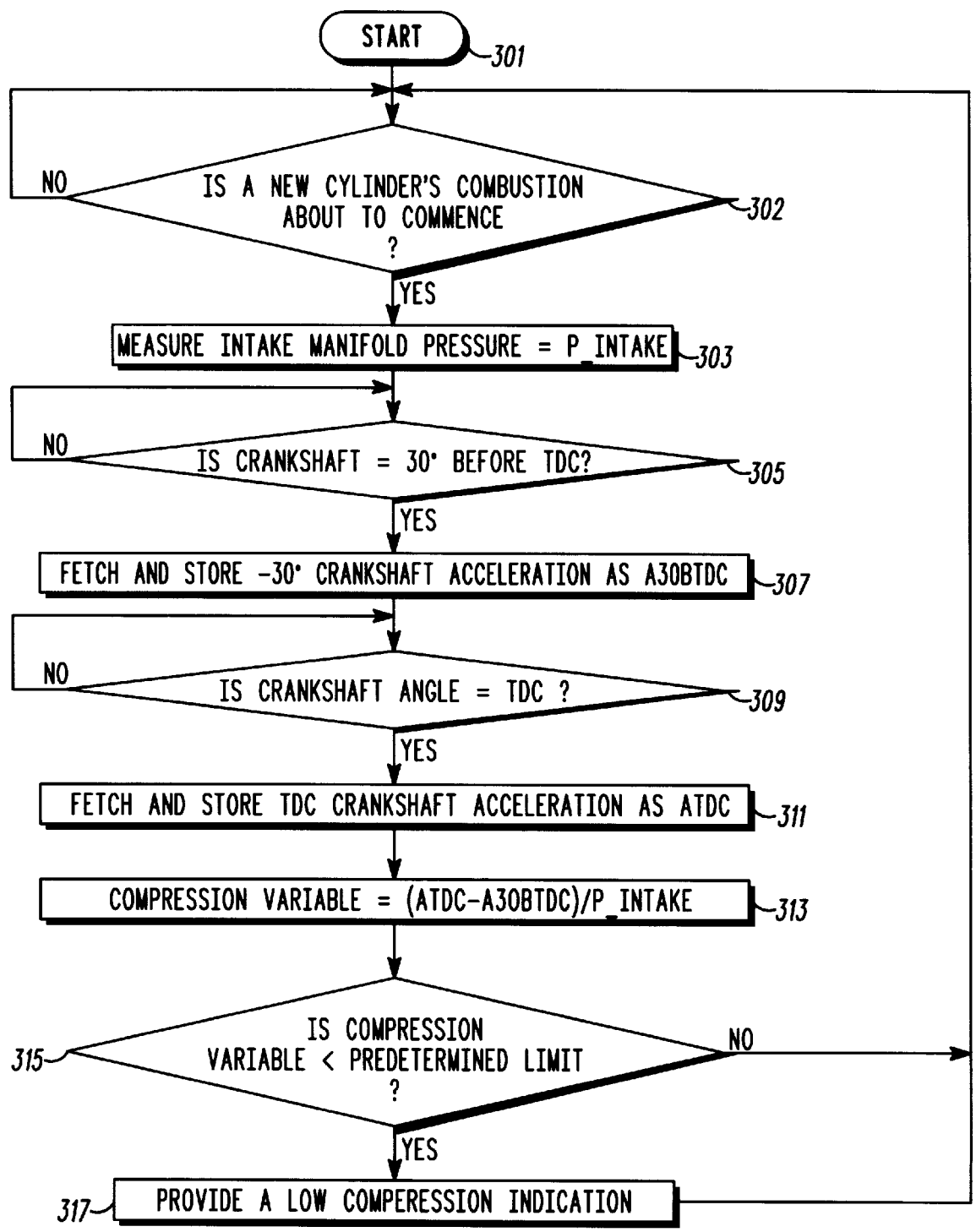
FIG. 3 is a method flow chart describing the operation of the method.

FIG. 3 is a method flow chart describing the operation of the low compression pressure detection method. As mentioned above, this flow chart 300 is representative of the firmware programmed into the MC68HC711 E9 microcontroller of the engine control 217. This firmware essentially recognizes the difference in behavior between the engine crankshaft acceleration signals 101 and 101' from FIG. 1 while taking into account the ambient air pressure. This method is a very attractive alternative to prior art low compression pressure detection systems because of the improved durability, simple calibration, low cost, and ease of manufacturing.

In step 301 the routine 300 is entered. Note that this routine shows that the method directly measures acceleration at a crankshaft angle of interest by waiting until it senses that angle. This is only one of the many ways to do this. Of course, those skilled in the art will recognize other, equivalent techniques such as capturing engine crankshaft acceleration's in separate routines and recalling and processing it here.

Next, in step 302, the engine control 217 waits until a new cylinder's combustion cycle is about to commence. This is determined as described above dependent on the TDC signal 215 and the engine angular displacement signal 207. When it is about to commence, step 303 is executed.

In the next step 303 the engine control 217 reads an intake manifold pressure signal 219 provided by an intake manifold pressure sensor 221 coupled to the engine's 200 intake manifold. This intake manifold pressure signal 219 is temporarily saved as P_INTAKE in step 303 for use in a later step. This intake manifold pressure signal, or variable, is an estimate of the mass charged into the cylinder—thus, in-effect, normalizes the determination described below for ambient pressures.

Next, in step 305 the engine control 217 determines if the crankshaft is positioned proximate 30° BTDC for the compressing cylinder. If it isn't, then 305 is repeated until the crankshaft is positioned proximate 30° BTDC. When the crankshaft is positioned proximate 30° BTDC step 307 is executed.

In the next step 307, the engine control 217 fetches, or reads, the crankshaft acceleration and stores is as A30BTDC for use in a later step.

Next, in step 309 the engine control 217 determines if the crankshaft is positioned proximate TDC for the now expanding cylinder. If it isn't, then 309 is repeated until the crankshaft is positioned proximate TDC. When the crankshaft is positioned proximate TDC step 311 is executed.

In the next step 311, the engine control 217 fetches, or reads, the crankshaft acceleration and stores is as ATDC for use in a later step.

Next, in step 313 EQUATION 1, described above, is computed using the P_INTAKE, A30BTDC, and ATDC variables acquired above thus providing a compression pressure variable indicative of the compression pressure in the active, still expanding, cylinder.

In step 315, the engine control 217 compares this compression pressure variable against a predetermined limit. This predetermined limit is empirically determined and is chosen such that if the compression pressure variable is less than this predetermined limit then a low compression condition exists in the active cylinder. If not, the routine 300 returns to step 302.

Next, in step 317 a low compression indication is provided if the predetermined limit was greater than the compression pressure variable. In this embodiment, the low compression indication is used internal to the engine control 217. Alternatively this indication may be provided externally.

Although, in the preferred embodiment, angles proximate 30° BTDC and TDC are used to measure engine crankshaft acceleration during a compression and a succeeding expansion stroke other angular positions may be used as long as they are within a range of ±10° of these angular positions. This is because for a typical slider crank mechanism used in current reciprocating engines the maximum rate of compression, or minimum acceleration occurs in this range.

In conclusion, a method for detecting a low compression pressure condition by interpreting acceleration of an engine crankshaft within a singular combustion cycle that substantially overcomes the deficiencies of the prior art is described. By combining several variables within a singular combustion cycle a low compression condition is detected. As earlier mentioned, by measuring engine crankshaft acceleration, rather than velocity as measured by other schemes, transient engine operation does not affect the observation of in-cylinder pressure measurement. Also, the engine crankshaft acceleration at TDC is used to normalize any same-cycle non-combustion related torques from the computed in-cylinder compression pressure variable, thus providing a more accurate and reliable indication of a low compression condition. Further, by measuring intake manifold pressure, load effects and ambient pressure related effects are compensated for. Additionally, since the supporting apparatus is already present in most contemporary engine control systems this method is very cost effective as only coding changes need to be added to most contemporary systems.

What is claimed is:

1. A method of compression pressure determination in a combustion chamber of a cylinder in a running engine, said method comprising the steps of:

measuring acceleration of a crankshaft of said running engine, said measurement centered proximate a maximum rate of compression of said cylinder, and providing a first acceleration variable responsive thereto; and providing a compression pressure variable having a magnitude indicative of a compression pressure in the combustion chamber of the cylinder in said running engine determined dependent on an amplitude of the measured first acceleration variable.

2. A method in accordance with claim 1 further comprising a step of providing a low compression indication when the magnitude of the compression pressure variable, provided in said step of providing a compression pressure variable, does not exceed a predetermined combustion pressure threshold.

3. A method in accordance with claim 1 further comprising the steps of:

measuring a second acceleration of the crankshaft of said running engine, and providing a second acceleration variable responsive thereto; and providing a compression pressure variable having a magnitude indicative of a compression pressure in the combustion chamber of the cylinder in said running engine determined dependent on an amplitude of the measured first acceleration variable and an amplitude of the second acceleration variable.

4. A method in accordance with claim 3 wherein said step of measuring a second acceleration is executed in a same combustion cycle as the step of measuring the first acceleration.

5. A method in accordance with claim 3 wherein said step of measuring a second acceleration is executed responsive to the step of measuring a first acceleration.

6. A method in accordance with claim 3 wherein said step of providing a compression pressure variable comprises subtracting the first acceleration variable from the second acceleration variable, wherein the difference provides a compression pressure variable indicative of a compression pressure in the combustion chamber of the cylinder in said running engine.

7. A method in accordance with claim 3 wherein said step of measuring a second acceleration of a crankshaft is executed proximate cylinder top-dead-center.

8. A method in accordance with claim 3 wherein each of said steps of measuring are executed in a singular combustion cycle.

9. A method in accordance with claim 3 further comprising a step of providing a low compression indication when the compression pressure variable, provided in said step of providing a compression pressure variable, does not exceed a predetermined combustion pressure threshold.

10. A method in accordance with claim 1 further comprising the steps of:

measuring an intake manifold pressure of said running engine, and providing an intake manifold pressure variable responsive thereto; and providing the compression pressure variable indicative of a compression pressure in the combustion chamber of the cylinder in said running engine determined dependent on both an amplitude of the first acceleration variable and the measured intake manifold pressure variable.

11. A method in accordance with claim 10 further comprising a step of providing a low compression indication when the magnitude of the compression pressure variable, provided in said step of providing a compression pressure variable, does not exceed a predetermined combustion pressure threshold.

12. A method of compression pressure determination in a combustion chamber of a cylinder in a running engine, said method comprising the steps of:

measuring acceleration of a crankshaft of said running engine, said measurement centered proximate a maximum rate of compression of said cylinder, and providing a first acceleration variable responsive thereto;

measuring an intake manifold pressure of said running engine, and providing an intake manifold pressure variable responsive thereto; and providing a compression pressure variable indicative of a compression pressure in the combustion chamber of the cylinder in said running engine by dividing the first acceleration variable by the measured intake manifold pressure variable.

13. A method in accordance with claim 12 further comprising a step of providing a low compression indication when the compression pressure variable, provided in said step of dividing, does not exceed a predetermined combustion pressure threshold.

14. A method of compression pressure determination in a combustion chamber of a cylinder in a running engine, said method comprising the steps of:

measuring an intake manifold pressure of said running engine associated with a pressure of air ingested into the combustion chamber of the cylinder, and providing an intake manifold pressure variable responsive thereto;

measuring a first acceleration of a crankshaft of said running engine, coincident with a compression cycle of the cylinder and providing a first acceleration variable responsive thereto;

measuring a second acceleration of the crankshaft of said running engine coincident proximate the cylinder's top-dead-center position, and providing a second acceleration variable responsive thereto; and providing a compression pressure variable having a magnitude indicative of a compression pressure in said combustion chamber of the cylinder determined dependent on an amplitude of the first acceleration variable, and an amplitude of the second acceleration variable, and the measured intake manifold pressure variable.

15. A method in accordance with claim 14 further comprising a step of providing a low compression indication when the magnitude of the compression pressure variable, provided in said step of providing a compression pressure variable, does not exceed a predetermined combustion pressure threshold.

16. A method in accordance with claim 14 wherein said step of measuring a second acceleration is executed responsive to the step of measuring a first acceleration.

17. A method of compression pressure determination in a combustion chamber of a cylinder in a running engine, said method comprising the steps of:

measuring an intake manifold pressure of said running engine associated with a pressure of air ingested into the combustion chamber of the cylinder, and providing an intake manifold pressure variable responsive thereto;

measuring a first acceleration of a crankshaft of said running engine, coincident with a compression cycle of the cylinder and providing a first acceleration variable responsive thereto, wherein the first acceleration measurement is executed proximate ±10° of the cylinder's maximum compression;

measuring a second acceleration of the crankshaft of said running engine coincident proximate the cylinder's top-dead-center position, and providing a second acceleration variable responsive thereto wherein the second acceleration measurement is executed proximate ±10° of the cylinder's top-dead-center position; and providing a compression pressure variable indicative of a compression pressure in said combustion chamber of the cylinder as a function of the first acceleration variable, the second acceleration variable, and the measured intake manifold pressure variable.

18. A method in accordance with claim 17 wherein said step of providing a compression pressure variable comprises the step of subtracting the first acceleration variable from the second acceleration variable and dividing the difference by the intake manifold pressure variable, wherein the division provides a compression pressure variable indicative of a compression pressure in the combustion chamber of the cylinder.

19. A method in accordance with claim 18 further comprising a step of providing a low compression indication when the compression pressure variable, provided in said step of subtracting and dividing, does not exceed a predetermined combustion pressure threshold.

20. A method in accordance with claim 17 wherein said step of measuring a first acceleration of a crankshaft is executed proximate 30° before a cessation of the compression cycle.

21. A method in accordance with claim 20 wherein said step of measuring a second acceleration is executed in a same combustion cycle as the step of measuring the first acceleration.

22. A method of compression pressure determination in a multi-cylinder reciprocating engine, said method comprising the steps of:

measuring an intake manifold pressure for each of a plurality of cylinders in said multi-cylinder reciprocating engine, and providing a plurality of intake manifold pressure variables responsive thereto for each of the plurality of cylinders;

measuring a first acceleration of a crankshaft for each of the plurality of cylinders in said multi-cylinder reciprocating engine, and providing a plurality of first acceleration variables responsive thereto;

measuring, later in time, a second acceleration of the crankshaft for each of the plurality of cylinders in said reciprocating engine, and providing a plurality of second acceleration variables responsive thereto; and subtracting each of the plurality of first acceleration variables from each of the plurality of second acceleration variables and dividing each of the plurality of differences by each of the plurality of intake manifold pressure variables, wherein each of the divisions provides a plurality of compression pressure variables indicative of each of the compression pressures of the plurality of cylinders in said multi-cylinder reciprocating engine.

23. A method in accordance with claim 22 wherein said step of measuring a first acceleration of a crankshaft for each of the plurality of cylinders is executed coincident with a compression cycle of each of the plurality of cylinders.

24. A method in accordance with claim 23 wherein said step of measuring a first acceleration of a crankshaft for each of the plurality of cylinders coincident with a compression cycle is executed proximate 30° before each of the plurality of cylinder's top-dead-center positions.

25. A method in accordance with claim 24 wherein the plurality of second acceleration variables is measured in a same combustion cycle as the plurality of first acceleration variables.

26. A method in accordance with claim 25 further comprising a step of providing a low compression indication when any of the plurality of compression pressure variables, provided in said step of subtracting and dividing, does not exceed a predetermined combustion pressure threshold.

27. A method of compression pressure determination in a combustion chamber of a cylinder in a reciprocating engine, said method comprising the steps of:
measuring a first engine crankshaft acceleration, proximate an engine crankshaft angle centered proximate a maximum rate of compression in the cylinder, and providing a first engine crankshaft acceleration reading;
measuring a second engine crankshaft acceleration, proximate an engine crankshaft angle corresponding to the cylinder's top-dead-center position, and providing a second engine crankshaft acceleration reading;
measuring an absolute pressure at an intake manifold coincident with the measurement of the first predetermined engine crankshaft angle and providing a pressure variable associated with the presently combusting cylinder;
subtracting the first engine crankshaft acceleration reading from the second engine crankshaft acceleration reading and dividing the difference by the pressure variable and providing a compression pressure variable indicative of pressure in the combusting cylinder; and
providing a low compression indication when the compression pressure variable, provided in said step of subtracting and dividing does not exceed a predetermined combustion pressure threshold.

28. An apparatus for determining compression pressure of a cylinder in a running engine, said apparatus comprising:
means for measuring acceleration of a crankshaft of said running engine centered proximate a maximum rate of compression of said cylinder, and providing a first acceleration variable responsive thereto; and
means for providing a compression pressure variable having a magnitude indicative of a compression pressure in the combustion chamber of the cylinder in said running engine, determined dependent on an amplitude of the measured first acceleration variable.

29. An apparatus in accordance with claim 28 further comprising means for providing a low compression indication when the magnitude of the compression pressure variable, provided by said means for providing a compression pressure variable, does not exceed a predetermined combustion pressure threshold.

30. An apparatus in accordance with claim 28 wherein said means for measuring acceleration of a crankshaft of said running engine measures a second acceleration of the crankshaft of said running engine, and provides a second acceleration variable responsive thereto, and wherein said means for providing a compression pressure variable indicative of a compression pressure in the combustion chamber of the cylinder in said running engine provides the compression pressure variable determined dependent on an amplitude of the measured first acceleration variable and an amplitude of the second acceleration variable.

31. An apparatus in accordance with claim 30 wherein said means for providing a compression pressure variable comprises means for subtracting the first acceleration variable from the second acceleration variable, wherein the difference provides a compression pressure variable indicative of a compression pressure in the combustion chamber of the cylinder in said running engine.

32. An apparatus in accordance with claim 31 further comprising means for providing a low compression indication when the magnitude of the compression pressure variable, provided by said means for subtracting, does not exceed a predetermined combustion pressure threshold.

33. An apparatus in accordance with claim 28 further comprising:
means for measuring an intake manifold pressure of said running engine, and providing an intake manifold pressure variable responsive thereto; and
wherein said means for providing a compression pressure variable indicative of a compression pressure in the combustion chamber of the cylinder in said running engine provides the compression pressure variable determined dependent on both an amplitude of the first acceleration variable and the measured intake manifold pressure variable.

34. An apparatus for determining compression pressure of a cylinder in a running engine, said apparatus comprising:
means for measuring acceleration of a crankshaft of said running engine centered proximate a maximum rate of compression of said cylinder, and providing a first acceleration variable responsive thereto;
means for measuring an intake manifold pressure of said running engine, and providing an intake manifold pressure variable responsive thereto; and
means for providing a compression pressure variable indicative of a compression pressure in the combustion chamber of the cylinder in said running engine, by dividing the first acceleration variable by the measured intake manifold pressure variable.

35. An apparatus in accordance with claim 34 further comprising means for providing a low compression indication when the compression pressure variable, provided by said means for providing a compression pressure variable, does not exceed a predetermined combustion pressure threshold.

36. An apparatus for determining compression pressure in a combustion chamber of a cylinder in a running engine, said apparatus comprising:
means for measuring an intake manifold pressure of said running engine associated with a pressure of air ingested into the combustion chamber of the cylinder, and providing an intake manifold pressure variable responsive thereto;
means for measuring a first acceleration of a crankshaft of said running engine, coincident with a compression cycle of the cylinder and providing a first acceleration variable responsive thereto, and for measuring a second acceleration of the crankshaft of said running engine coincident proximate the cylinder's top-dead-center position and providing a second acceleration variable responsive thereto; and means for providing a compression pressure variable having a magnitude indicative of a compression pressure in said combustion chamber of the cylinder determined dependent on an amplitude of the first acceleration variable, and an amplitude of the second acceleration variable, and the measured intake manifold pressure variable.

37. An apparatus in accordance with claim 36 further comprising means for providing a low compression indication when the magnitude of the compression pressure variable, provided by said means for providing a compression pressure variable, does not exceed a predetermined combustion pressure threshold.

38. An apparatus for determnining compression pressure in a combustion chamber of a cylinder in a running engine, said apparatus comprising:

means for measuring an intake manifold pressure of said running engine associated with a pressure of air ingested into the combustion chamber of the cylinder, and providing an intake manifold pressure variable responsive thereto;

means for measuring a first acceleration of a crankshaft of said running engine, coincident with a compression cycle of the cylinder and providing a first acceleration variable responsive thereto, and for measuring a second acceleration of the crankshaft of said running engine coincident proximate the cylinder's top-dead-center position and providing a second acceleration variable responsive thereto; and means for providing a compression pressure variable indicative of a compression pressure in said combustion chamber of the cylinder by subtracting the first acceleration variable from the second acceleration variable and dividing the difference by the intake manifold pressure variable, wherein the division provides a compression pressure variable indicative of a compression pressure in the combustion chamber of the cylinder.

39. An apparatus in accordance with claim 38 further comprising means for providing a low compression indication when the compression pressure variable, provided by said means for subtracting and dividing, does not exceed a predetermined combustion pressure threshold.

40. An apparatus in accordance with claim 38 wherein said means for measuring a first acceleration of a crankshaft comprises means for measuring the first acceleration proximate 30° before a cessation of the compression cycle.

41. An apparatus in accordance with claim 40 wherein said means for measuring a second acceleration of a crankshaft comprises means for measuring the second acceleration in a same combustion cycle as first acceleration is measured by said means for measuring a first acceleration.

42. An apparatus in accordance with claim 38 wherein said means for measuring a first acceleration of a crankshaft comprises means for measuring the first acceleration proximate ±10° of the cylinder's maximum compression and said means for measuring a second acceleration of a crankshaft comprises means for measuring the second acceleration proximate ±10° of the cylinder's top-dead-center position.

43. An apparatus for determining compression pressure in a multi-cylinder reciprocating engine, said apparatus comprising:

means for measuring an intake manifold pressure for each of a plurality of cylinders in said multi-cylinder reciprocating engine, and providing a plurality of intake manifold pressure variables responsive thereto for each of the plurality of cylinders;

means for measuring a first acceleration of a crankshaft for each of the plurality of cylinders in said multi-cylinder reciprocating engine and for providing a plurality of first acceleration variables responsive thereto, and, later in time, for measuring a second acceleration of the crankshaft for each of the plurality of cylinders in said reciprocating engine and for providing a plurality of second acceleration variables responsive thereto; and means for subtracting each of the plurality of first acceleration variables from each of the plurality of second acceleration variables and for dividing each of the plurality of differences by each of the plurality of intake manifold pressure variables, wherein each of the divisions provides a plurality of compression pressure variables indicative of each of the compression pressures of the plurality of cylinders in said multi-cylinder reciprocating engine.

44. An apparatus in accordance with claim 43 wherein said means for measuring a first acceleration of a crankshaft for each of the plurality of cylinders comprises means for measuring a first acceleration coincident with a compression cycle of each of the plurality of cylinders.

45. An apparatus in accordance with claim 44 wherein said means for measuring a first acceleration of a crankshaft for each of the plurality of cylinders coincident with a compression cycle comprises means for measuring a first acceleration proximate 30° before each of the plurality of cylinder's top-dead-center positions.

46. An apparatus in accordance with claim 45 wherein the means for measuring the plurality of second acceleration variables comprises means for measuring each of the plurality of second variables in a same combustion cycle as each of the corresponding plurality of first acceleration variables.

47. An apparatus in accordance with claim 46 further comprising means for providing a low compression indication when any of the plurality of compression pressure variables, provided by said means for subtracting and dividing, does not exceed a predetermined combustion pressure threshold.

48. An apparatus for determining compression pressure in a combustion chamber of a cylinder in a reciprocating engine, said apparatus comprising:

an accelerometer for measuring engine crankshaft acceleration at an engine crankshaft angle centered proximate a maximum rate of compression in the cylinder and for providing a first engine crankshaft acceleration reading, and for measuring a second engine crankshaft acceleration at an engine crankshaft angle corresponding to the cylinder's top-dead-center position and for providing a second engine crankshaft acceleration reading;

an absolute pressure sensor measuring an absolute pressure at an intake manifold coincident with the measurement of the first predetermined engine crankshaft angle and providing a pressure variable associated with the presently combusting cylinder; and a control device for subtracting the first engine crankshaft acceleration reading from the second engine crankshaft acceleration reading and dividing the difference by the pressure variable and providing a compression pressure variable indicative of pressure in the combusting cylinder, and for providing a low compression indication when the compression pressure variable does not exceed a predetermined combustion pressure threshold.

* * * * *